US011418502B2

(12) United States Patent
Dickenson

(10) Patent No.: US 11,418,502 B2
(45) Date of Patent: Aug. 16, 2022

(54) INPUT ENTRY BASED ON USER IDENTITY VALIDATION

(71) Applicant: INTERNATIONAL BUSINESS MACHINES CORPORATION, Armonk, NY (US)

(72) Inventor: Marc Dickenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 16/196,042

(22) Filed: Nov. 20, 2018

(65) Prior Publication Data

US 2020/0162456 A1    May 21, 2020

(51) Int. Cl.
*H04L 29/00*      (2006.01)
*H04L 9/40*       (2022.01)
*H04W 12/63*      (2021.01)

(52) U.S. Cl.
CPC ......... *H04L 63/0861* (2013.01); *H04W 12/63* (2021.01)

(58) Field of Classification Search
CPC .................................................. H04L 63/0861
USPC ............................................................ 726/6
See application file for complete search history.

(56) References Cited

U.S. PATENT DOCUMENTS

| 5,757,918 | A  | * | 5/1998 | Hopkins | .............. | G06Q 20/341 |
|  |  |  |  |  |  | 705/67 |
| 6,412,692 | B1 |  | 7/2002 | Miyagawa |  |  |
| 2004/0189441 | A1 | * | 9/2004 | Stergiou | ................ | H04M 3/382 |
|  |  |  |  |  |  | 340/5.51 |
| 2004/0204951 | A1 | * | 10/2004 | Wood | ...................... | G07F 7/025 |
|  |  |  |  |  |  | 705/4 |
| 2014/0366050 | A1 | * | 12/2014 | Hatambeiki | ..... | H04N 21/44218 |
|  |  |  |  |  |  | 725/12 |
| 2016/0057138 | A1 | * | 2/2016 | Hoyos | .............. | G06Q 20/40145 |
|  |  |  |  |  |  | 726/7 |

FOREIGN PATENT DOCUMENTS

| JP | P2012108646 A | 6/2012 |
| WO | 2004038632 A1 | 5/2004 |
| WO | 2010096699 A2 | 8/2010 |

OTHER PUBLICATIONS

Mell et al., "The NIST Definition of Cloud Computing", National Institute of Standards and Technology, Special Publication 800-145, Sep. 2011, pp. 1-7.

\* cited by examiner

*Primary Examiner* — Brandon Hoffman
*Assistant Examiner* — Michael D Anderson
(74) *Attorney, Agent, or Firm* — Steven M. Bouknight

(57) ABSTRACT

Embodiments of the present invention disclose a method, a computer program product, and a computer system for entering a user input based on validating a user identity. A computer receives a user input and, provided the computer has received user consent, captures user data. In addition, computer extracts purported user identity data and determines whether the data of the purported user identity matches that captured. Based on determining that the user identity is validated, the computer enters the received user input and provides feedback regarding the user input. Based on determining that the user identity is not validated, the computer does not enter the received user input, provides feedback regarding the user input, and provides recourse or an opportunity to cure deficiencies causing the input not to be entered.

14 Claims, 5 Drawing Sheets

INPUT ENTRY BASED ON USER IDENTITY VALIDATION

BACKGROUND

The present invention relates generally to identity validation, and more particularly to validating user identity prior to entering user input.

Identity validation is a vital aspect of many modern security systems put in place to prevent unauthorized individuals from accessing various resources. For example, user credentials may be required to access an online bank account, a badge may be required to enter a work building, or a license may be required to operate a vehicle. Despite the many modern advances in identity validation systems, the threat of identity fraud, identity impersonation, and information breach remains.

SUMMARY

Embodiments of the present invention disclose a method, a computer program product, and a computer system for entering a user input based on validating a user identity. According to an embodiment, the present invention is capable of capturing one or more user characteristics corresponding to the user via one or more sensors and extracting one or more reference user characteristics corresponding to the user from a user reference database. Moreover, the invention is capable of determining whether the one or more captured user characteristics match the one or more extracted reference user characteristics and, based on determining that the one or more captured user characteristics match the one or more extracted reference user characteristics, recording the received user input.

Embodiments of the present invention further comprise providing the user a reference receipt having one or more statistics regarding the entered user input, a timestamp, a geotag, and the one or more captured user characteristics.

According to other embodiments, based on determining that the one or more captured user characteristics mismatch the one or more extracted reference user characteristics, the invention does not enter the received user input and provides the user an opportunity to cure one or more deficiencies causing the determined mismatch.

According to further embodiments, the invention may further comprise prompting the user to answer one or more identity verification questions and determining whether the user answered the one or more identity verification questions correctly. Moreover, in such embodiments, determining whether the one or more captured user characteristics match the one or more extracted reference user characteristics is further based on determining that the user answered the one or more identity verification questions correctly.

In embodiments, the one or more sensors capture biometric data. In other embodiments, the one or more sensors capture behaviometric data.

In accordance with some embodiments, the one or more captured user characteristics are weighted and determining whether the one or more captured user characteristics match the one or more extracted reference user characteristics is further based on a weight of the matches exceeding a threshold.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete, and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements of various embodiments of the present invention.

Figure 1:
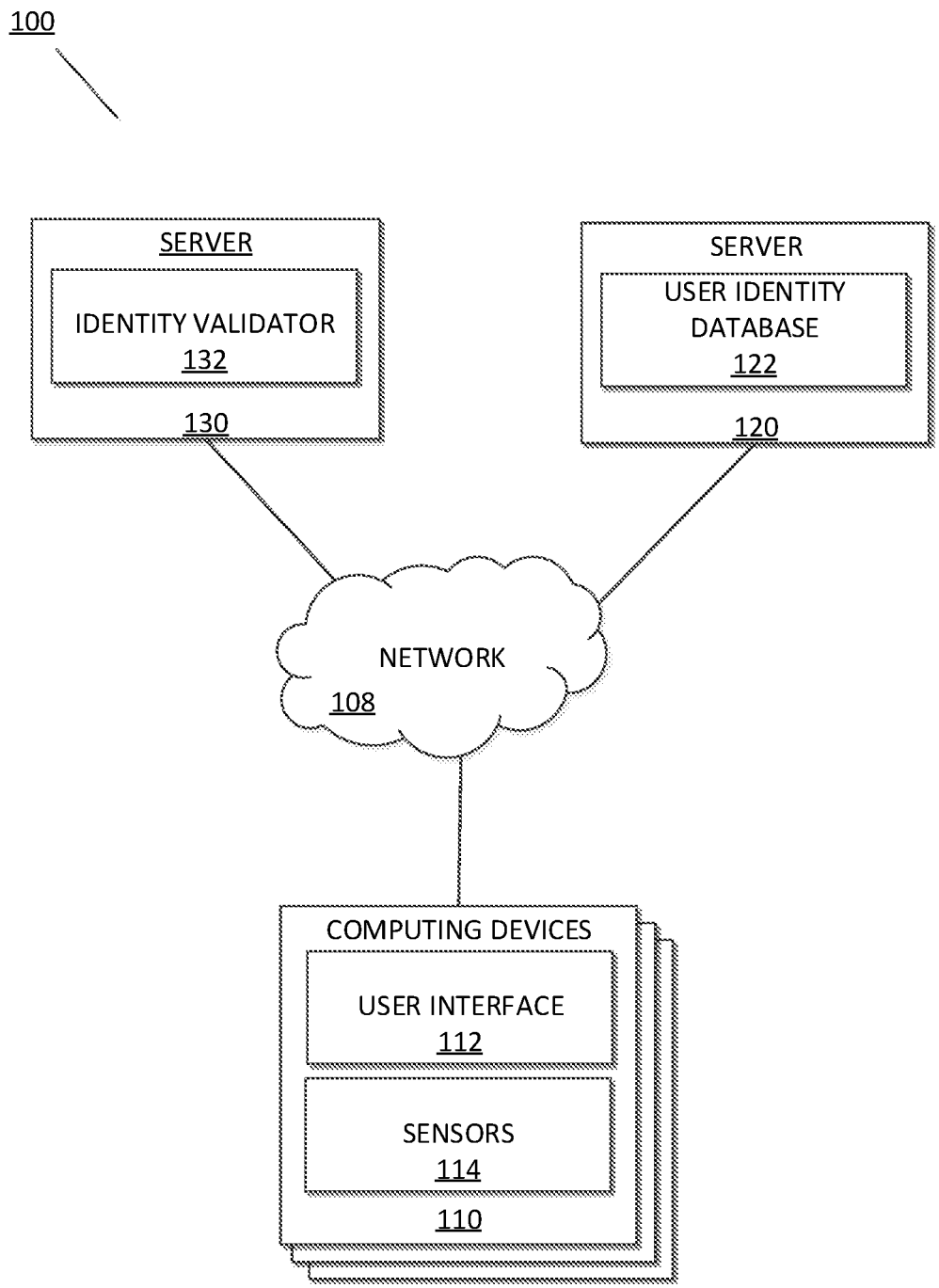
FIG. 1 depicts a schematic diagram of an identity validation system 100, in accordance with an embodiment of the present invention.

FIG. 1 depicts an identity validation system 100, in accordance with embodiments of the present invention. In the example embodiment, the identity validation system 100 includes computing devices 110, a server 120, and a server 130, all interconnected via a network 108. While, in the example embodiment, programming and data of the present invention are stored and accessed remotely across several servers via the network 108, in other embodiments, programming and data of the present invention may be stored locally on as few as one physical computing device or amongst other computing devices than those depicted.

In the example embodiment, the network 108 is a communication channel capable of transferring data between connected devices. In the example embodiment, the network 108 is the Internet, representing a worldwide collection of networks and gateways to support communications between devices connected to the Internet. Moreover, the network 108 may include, for example, wired, wireless, and/or fiber optic connections which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 can be any combination of connections and protocols that will support communications between connected devices.

Figure 3:
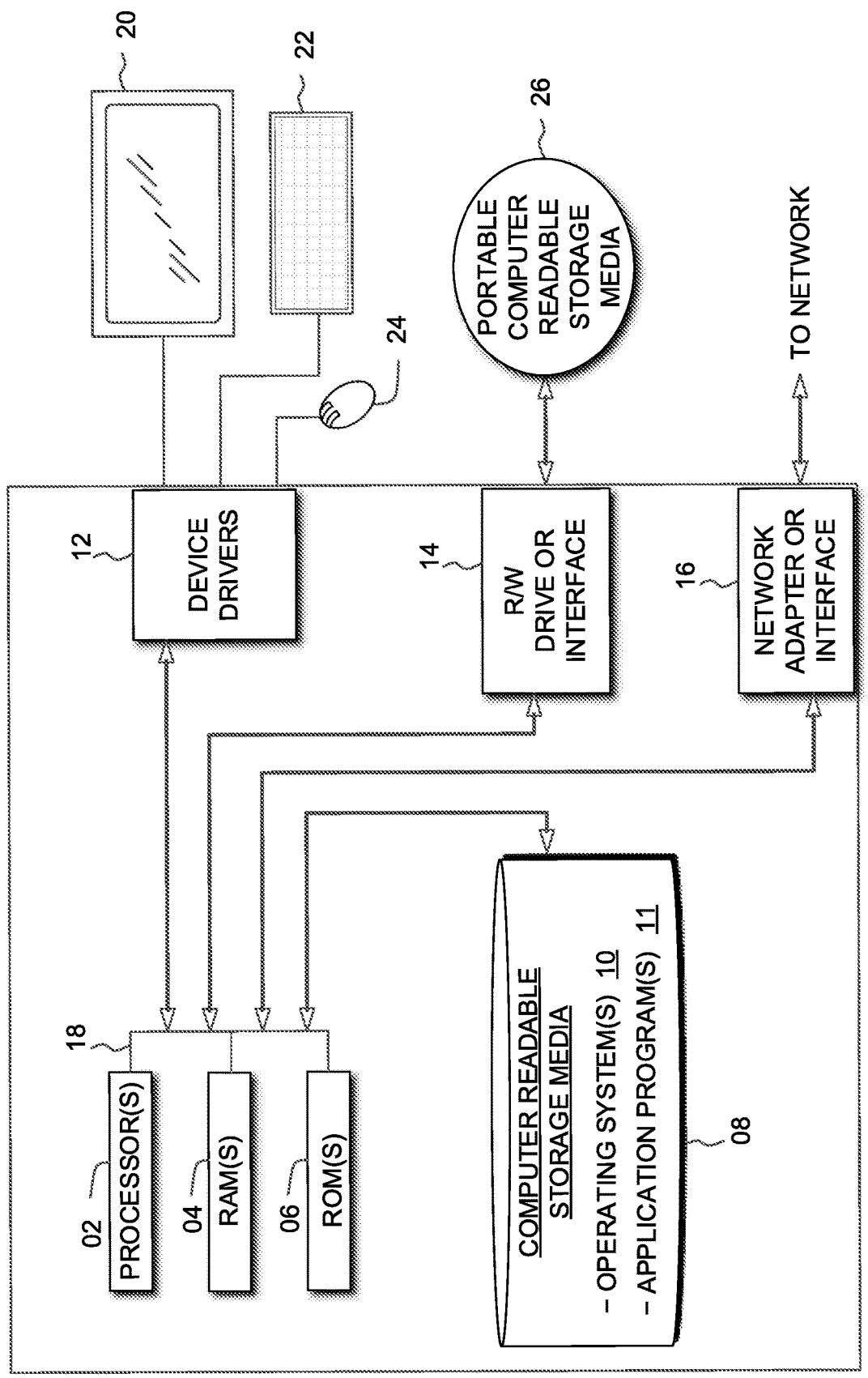
FIG. 3 illustrates a block diagram depicting the hardware components of the identity validation system 100 of FIG. 1, in accordance with an example embodiment of the present invention.

In the example embodiment, the computing devices 110 include a user interface 112 and sensors 114, and may be one or more of a server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other computing devices. While FIG. 1 illustrates only one instance of the computing devices 110 in the interest of brevity, in other embodiments, any number of instances of the computing devices 110 may be implemented within the identity validation system 100. The computing devices 110 are described in greater detail with reference to FIG. 3.

In the example embodiment, the user interface 112 is a software application that allows one or more users of the computing devices 110 to interact with connected devices via network 108. In addition, the user interface 112 may be connectively coupled to hardware components, such as those depicted by FIG. 3, for receiving user input. In embodiments, the user interface 112 may be implemented as a standalone software application, while in others the user interface 112 may be integrated with other software or implemented via a web browsing application. In the example embodiment, the user interface 112 is capable of transferring data files, including text, audio, images, video, compressed data, etc., individually or in bulk.

In the example embodiment, the sensors 114 are one or more software and/or hardware modules integrated with the computing devices 110 that allow for the computing devices 110 to gather data. In the example embodiment, the sensors 114 include a camera having physiological sensors capable of implementing facial as well as retina/iris recognition. Moreover, in embodiments, the sensors 114 may further include a fingerprint/palm scanner, DNA scanner, microphone, RFID scanner, barcode scanner, and other physiological sensors. In yet further embodiments, the sensors 114 may further recognize behavioural characteristics, such as typing rhythm, gait, voice, etc. In addition, the sensors 114 may further include an accelerometer, gyroscope, barometer, a means for connecting to a global positioning system (GPS), and other integrated sensors for collecting information. The sensors 114 are described in greater detail with respect to FIG. 2, forthcoming.

In the example embodiment, the server 120 includes a user identity database 122, and may be a server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other devices. While the server 120 is shown as a single device, in other embodiments, the server 120 may be comprised of a cluster or plurality of computing devices, working together or working separately. The server 120 is described in greater detail with reference to FIG. 3.

The user identity database 122 is a collection of data detailing one or more registered users. In the example embodiment, such registered users may be any authorized group of persons, such as employees, students, members, shareholders, subscribers, attendees, citizens, and the like. Data of said registered users includes general and demographic characteristics, such as such as a user's name, age, gender, location, place of birth, nationality, race, education, employment, identification number (such as an employee, serial, or license number), etc. In addition, the user data further includes physiological characteristics unique to a user (referred to herein as "biometric" data), such as characteristics of a user face and physique, retina/iris, fingerprint/palmprint, voiceprint, blood type, DNA sequence, etc., as well as habitually defined physiological data (referred to herein as "behaviometric" data), such as typing cadence and gait. In the example embodiment, the user identity database 122 is maintained by a trusted authority, such as a federal, state, municipal, company, institute, or school agency, and therefore can be relied on to provide authentic and valid information regarding the purported identity of a user. Moreover, user information stored in identity database 122 is collected with the users knowledge and consent, for example through manual or automated entry of user information prior to use of the identity validator 124. In such embodiments, a user may be prompted to provide consent regarding various characteristics and a user may select which characteristics for which they consent the collection of. Such prompts for consent may be received and acknowledged by a user via the user interface 112 of the computing devices 110. In the event the identity database 122 does not have the consent of a user to obtain user information, the identity validator 122 may be programmed to prompt a user for consent or immediately halt operations described herein. The user identity database 122 is described in greater detail with respect to FIG. 2.

In the example embodiment, the server 130 includes an identity validator 124, and may be a server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, or any other electronic device or computing system capable of receiving and sending data to and from other devices. While the server 130 is shown as a single device, in other embodiments, the server 130 may be comprised of a cluster or plurality of computing devices, working together or working separately. The server 130 is described in greater detail with reference to FIG. 3.

The identity validator 132 is a software program capable of receiving a user input and capturing user data. In addition, the identity validator 132 is capable of extracting purported user identity data and determining whether the data of the purported user identity matches that captured. Based on determining that the user identity is validated, the identity validator 132 enters the received user input and providing feedback regarding the user input. Based on determining that the user identity is not validated, the identity validator 132 does not enter the received user input, provides feedback regarding the user input, and provides recourse or an opportunity to cure deficiencies causing the input not to be entered. The operations of the identity validator 132 are described in greater detail with reference to FIG. 2.

Figure 2:
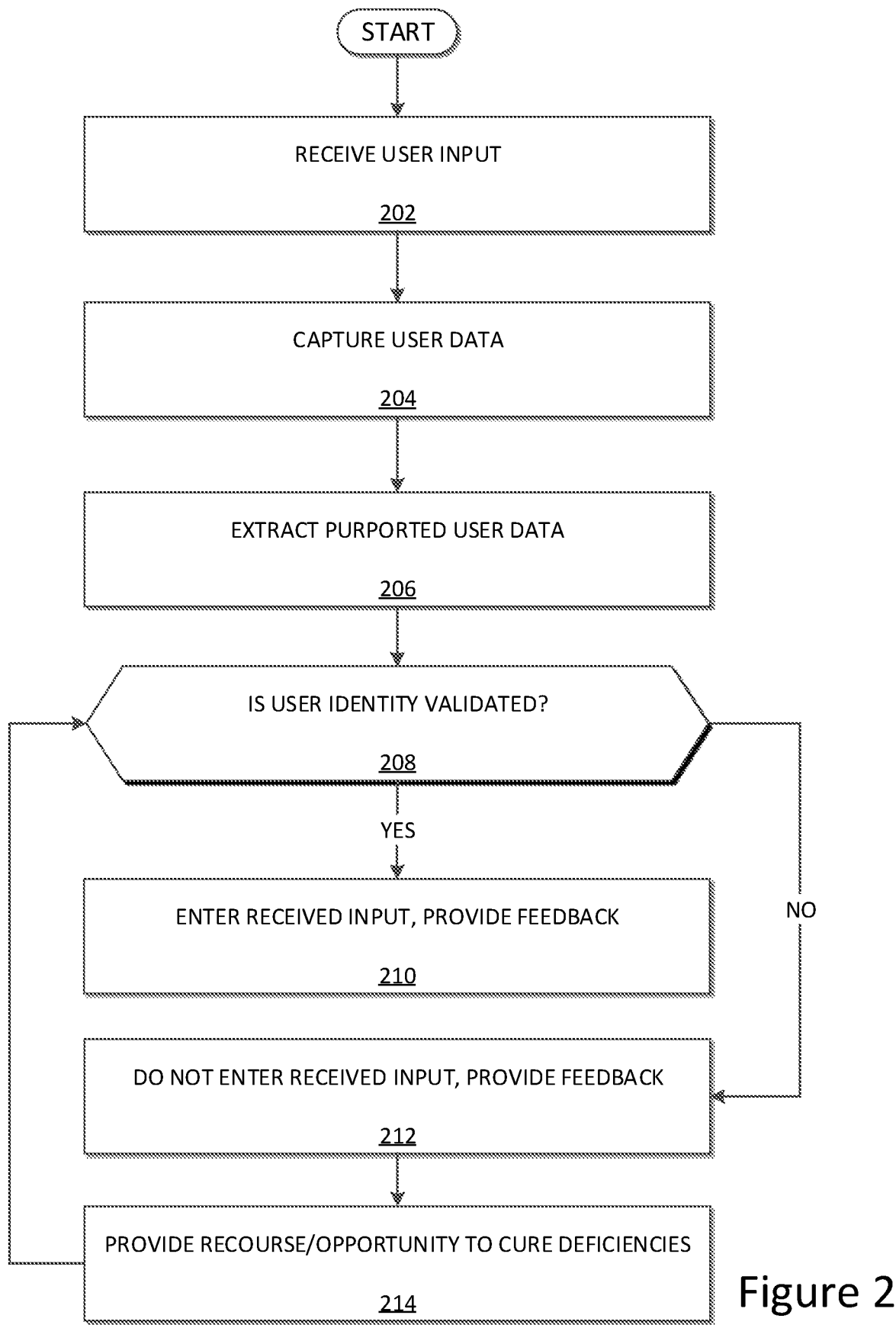
FIG. 2 depicts a flowchart illustrating the operations of an identity validator 132 of the identity validation system 100 in deriving a wind map via multi-source analysis.

FIG. 2 illustrates the operations of the identity validator 132 of the identity validation system 100 in validating a user identity. It will be appreciated by one skilled in the art that the operations of the identity validator 132 set forth by FIG. 2, and particularly those illustrated by steps 202, 204, 206, and 208, may be performed simultaneously or in various orders. In the example embodiment, for example, the identity validator 132 receives a user input (step 202) prior to capturing user data (step 204), extracting purported user data (step 206), and validating a user identity (determination 208) (note that steps 204, 206, and determination 208 of FIG. 2 may be collectively referred to as "validation steps"). Such implementation may be advantageous if a user wishes to enter a user input but is unable to validate their identity at the time, for example if a trusted reference database is queued, offline, or otherwise inaccessible. In other embodiments, however, the identity validator 132 may perform the validation steps prior to receiving a user input, which may be advantageous in embodiments where, for example, processing a large user input can be avoided if an identity is first invalidated. It will be appreciated that implementations in addition to those enumerated above may be employed without deviating from the novelty of the present invention.

Proceeding now to FIG. 2, the identity validator 132 receives user input via the user interface 112 of at least one of the computing devices 110 (step 202). In the example embodiment, the identity validator 132 is configured to receive a user input and, prior to entering, transmitting, or otherwise utilizing the received user input, validating an identity of a user that is utilizing the computing devices 110. The received user input may be an electronic or hardcopy document, text, image, video, audio, a poll selection, or other form of data. In the example embodiment, the computing devices 110 transmit the received user input to the identity validator 132 on the server 130 via the network 108. In some embodiments, the computing devices 110 may be a stationary device, such as a desktop computer or voting booth, while in other embodiments the computing devices 110 may a mobile device, such as a smart phone or laptop.

To further illustrate the operations of the identity validator 132, reference is now made to an illustrative example where a user utilizes one of the computing devices 110 to cast a vote for a candidate running for chairman of a corporation.

Turning back now to FIG. 2, the identity validator 132 captures user data (step 204). In addition to the input itself, the identity validator 132 is configured to prompt the user for data supporting their purported identity in situations warranting such. For example, identity validation may be required to view or upload confidential documents. In the example embodiment, the identity validator 132 may capture user data in either or both of two ways, the first being by way of user input. Specifically, the identity validator 132 may be configured to receive general user data, hereinafter referred to as "demographic data", such as a name, age, gender, location, race, education, employment, identification number (such as an employee, serial, or license number), birthplace, and the like. In some of such embodiments, the user may be required to simply enter and certify their corresponding demographic information while, in other embodiments, further verification may be required. Such further verification may require presenting a government issued identification card, such as a passport, military ID, or license. In such embodiments, presenting a valid identification card may automatically retrieve demographic information corresponding to the user, thereby eliminating a need for a user to submit all information manually. In other embodiments, other means for verifying user identity may be implemented. For example, the identity validator 132 may require that a user swipe a badge having a RFID chip across an RFID reader, connect a device with a MAC address specific to the user (e.g., smart phone, PC), or perform two stage verification using a personalized code received via text, email, etc. Alternatively, the identity validator 132 may implement a digital version of a notary public where one or more validated users vouch as to the identity of the purported user. In general, the identity validator 132 may be configured to implement any supplemental identity verification methods known in the art.

A second manner in which the identity validator 132 captures user data is via the sensors 114, which may be configured to capture various physiological characteristics of the user, herein referred to as "biometric data". Such biometric data of the user may include features such as a face/physique, a retina/iris, a fingerprint/palmprint, a voiceprint, blood sample, DNA, embedded chips within the body of the user, or another physiological characteristic unique to a user. In embodiments, the biometric data corresponding to the user may be extended to behaviour of the user, sometimes referred to as "behaviometrics", and include typing rhythm/cadence, gait, and other behavioural characteristics.

In further embodiments, the identity validator 132 may be further configured to capture user data by implementing a mix of the above two capture methods. For example, in embodiments capturing an image, video, or recording of the user, third parties identified within the captured media may be prompted to vouch for or confirm an identity of the user. Again, it should be noted that collection and use of user information is limited to that for which a user or third party consents, either impliedly or expressly. Accordingly, third parties identified herein must, too, consent to such data collection and use of user information. Moreover, in some embodiments, capturing user data as described herein may be contingent on firstly receiving express consent of a user regarding what data may be collected and how it may be used.

With reference again to the previously introduced example, the identity validator 132 receives demographic information corresponding to the user by scanning the barcode of an employment issued identification card and imports a corresponding user profile. In addition, and with consent of a user, the identity validator 132 captures biometric data by capturing the face, retina, thumb print, and voice of the user.

The identity validator 132 extracts data corresponding to the purported identity of the user (step 206). The identity validator 132 utilizes information extracted from the user identity database 122 in order to validate an identity of the user, and therefore the identity validator 132 retrieves a profile corresponding to the purported identity of the user. In embodiments wherein a user provides a valid identification card at the capture user data stage, the identity validator 132 retrieves a profile corresponding to the identity presented by the identification card. In embodiments wherein a user manually enters demographic information, the identity validator 132 first searches for a profile corresponding to a purported identity of the user within the user identity database 122, then extracts biometric data (as well as any missing demographic data) that corresponds to the purported identity of the user. In embodiments where the identity validator 132 is unable to find or otherwise extract purported user data from the user identity database 122, the identity validator 132 may proceed directly to steps 212 and 214, wherein the user is provided feedback indicating that his purported identity was not found and, in some embodiments, provided further recourse.

Referring now to the previously introduced illustrative example, the identity validator 132 extracts data corresponding to the face, retina, thumb print, and voice of a purported user from an employee registry based on the data provided by the scanned, employee issued identification card. If the identity validator 132 is unable to extract data corresponding to the purported identity of the user, the identity validator 132 may proceed to step 212, described in greater detail forthcoming.

The identity validator 132 determines whether the user identity is validated (determination 208). In the example embodiment, the identity validator 132 determines whether the purported identity of the user is validated based on comparing the captured user data (step 204), including the biometric data and optionally any demographic data, to that extracted from the user identity database 122 (step 206). Here, the determination may be positive or dispositive depending on a configuration of the user. In some embodiments, the identity validator 132 may validate an identity provided that at least one of the captured biometric data matches that of the user identity database 122. In other embodiments, the identity validator 132 may validate an identity provided that a majority of the captured biometric data matches that of the user identity database 122. In yet further embodiments, each of the biometrics may be weighted, for example based on a reliability or accuracy of the metric, and the identity validator 132 may validate an identity provided that a weighted score of the matching, captured biometric data exceeds an absolute or relative threshold.

With reference to the previously introduced example, the identity validator 132 compares the captured face, retina, thumb print, and voice of the user to that extracted from the employee registry.

If the identity validator 132 determines that the user identity is validated (determination 208, "YES" branch), then the identity validator 132 enters/records the received user input and provides statistics (step 210). In the example embodiment, upon verification of the identity of the user, the identity validator 132 enters the input and provides a confirmation to the user that a corresponding input has been received. In some embodiments, this process may further comprise assigning an entry reference number complete with a timestamp, geotag, the matching biometric used along with corresponding data, and other metadata such that the input can be later referenced, tracked, and audited. This reference information may be saved, printed, push notified/emailed to the user, transmitted to an authoritative agency, etc. In addition, some implementations of the present invention may further include providing statistics on the user input and, when applicable, statistics on one or more user inputs received by other instances of the one or more computing devices 110. Such statistics regarding the user input(s) may include probabilities, percentages, distributions, etc.

With reference again to the illustrative example aforementioned, if the identity validator 132 determines that the user identity is validated, the identity validator 132 enters the received vote cast by the user, displays statistics regarding a distribution of the votes cast (e.g., current chairman election results), and prints a reference receipt that includes a timestamp, geotag, and images of the face, retina, and thumb captured by the computing devices 110 as biometric data.

If the identity validator 132 determines that the user identity is not validated (determination 208, "NO" branch), then the identity validator 132 does not enter the received user input and provides statistics (step 212). In a similar manner to that above, the identity validator 132 determines whether the user identity is validated and does not enter, transmit, or otherwise utilize the received user input. In addition, the identity validator 132 may indicate through feedback why the user identity was not validated or why the user input was not entered. For example, the identity validator 132 may have been unable to identify or extract information corresponding to the purported identity of the user, the user may not be properly registered, the user may have already provided a user input, etc. While the received user input is not entered, the identity validator 132 may nonetheless note the fact that the user attempted to enter a user input and take further action. Such further action may include contacting the registered user whom the invalidated user purported to be, flagging the invalidated individual, and transmitting the invalidated individuals captured biometric data to an authoritative body.

With reference again to the illustrative example aforementioned, if the identity validator 132 determines that the user identity is not validated, the identity validator 132 does not enter the received vote and indicates to the user that the input was rejected because the captured user data did not match that extracted from the employee registry. Alternatively, the identity validator 132 may instead indicate that the user has already cast a vote, does not have authority to vote, or is registered to a different venue/jurisdiction.

The identity validator 132 provides recourse and an opportunity to cure deficiencies (step 214). Depending on a reason why the user identity was invalidated, the identity validator 132 may be able to provide recourse and/or an opportunity to cure any deficiencies leading to the rejection of the received user input. Such recourse may include indicating that a user must first be registered, and directing the user to the registration authority. Alternatively, the identity validator 132 may direct a user to a correct forum for entering the user input, or to a help desk or technical support. In embodiments, such recourse may include providing the user an additional chance to input additional information supporting their purported identity. Such additional information may include a reason why captured data may not match that of the user identity database 122, for example the user may have been in an accident or have a condition impairing one of the means for validation, and subsequently allow a user to submit data supporting such a scenario. Alternatively, the identity validator 132 may be configured to prompt the user to answer one or more follow-up questions in a last opportunity to verify their identity, for example multiple choice questions regarding themselves such as where they have previously lived or mother's maiden name. Moreover, correctly answering such follow-up questions may trigger the identity validator 132 to reconsidered whether the user identity is validated (determination 208) and, for example, such corroborating information may be incorporated into the weighted score described above for reassessment against the absolute or relative thresholds.

Continuing the example above, the identity validator 132 recommends contacting the board of directors of the company if the user did not already cast a ballot, and additionally provides a reference receipt, including the timestamp, geotag, and captured user data from the original vote casting. Alternatively, the identity validator 132 may recommend the user travel to the appropriate venue to cast the vote or seek authorization from an appropriate authority. In further embodiments, the identity validator 132 may ask the user to provide additional identification support or answer questions relating to a previous address, mother's maiden name, and other questions before incorporating the results of the prompted questions into a validity reassessment at determination 208.

In addition to providing user input contingent on identity validation, it will be appreciated by one skilled in the art that the present invention provides other benefits, as well, described in detail below.

Having captured user data at the moment a user input is received, the present invention provides a means for auditing the results of any user input collection by the user themselves or an authoritative body. Moreover, by capturing the conditions at which the user input was received in the reference receipt, including the timestamp, geotag, captured user data, and the like, a comprehensive record of user input may be referenced at any time to ensure a validity and accuracy of any user input collections.

Moreover, such recordation allows a user themselves to revisit a user input and track that input over time. In embodiments, the identity validator 132 may be configured to allow a user to capture user data a second time, for example via capturing a selfie or reference receipt, in order to view previously submitted user inputs and feedback from those instances.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

Figure 4:
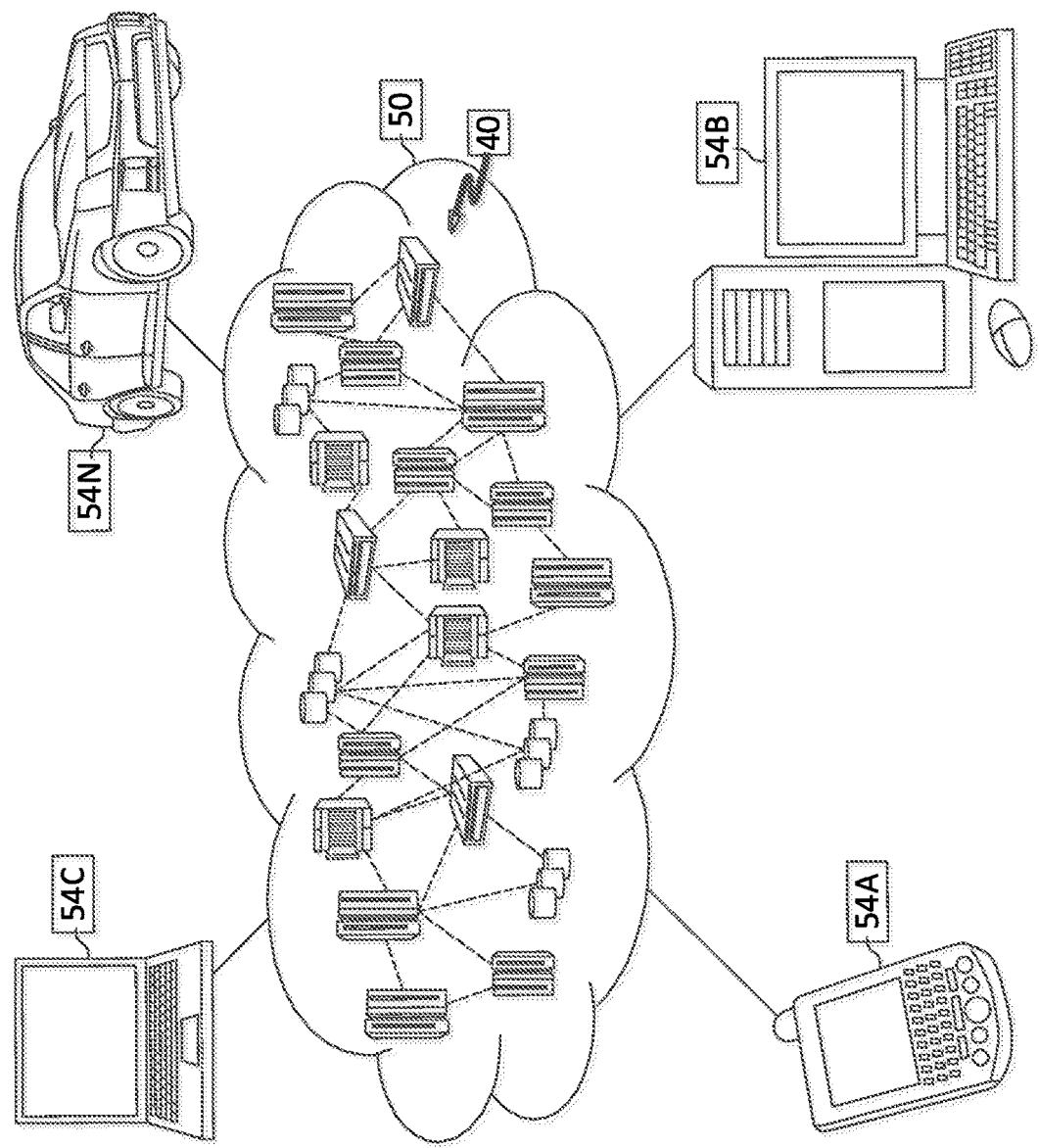
FIG. 4 depicts a cloud computing environment, in accordance with an embodiment of the present invention.

FIG. 4 depicts a block diagram of computing devices comprising the identity validation system 100 of FIG. 1 ("the computing devices"), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The computing devices may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example interaction prediction program 142, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing devices may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

The computing devices may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

The computing devices may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

It is to be understood that although this disclosure includes a forthcoming detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
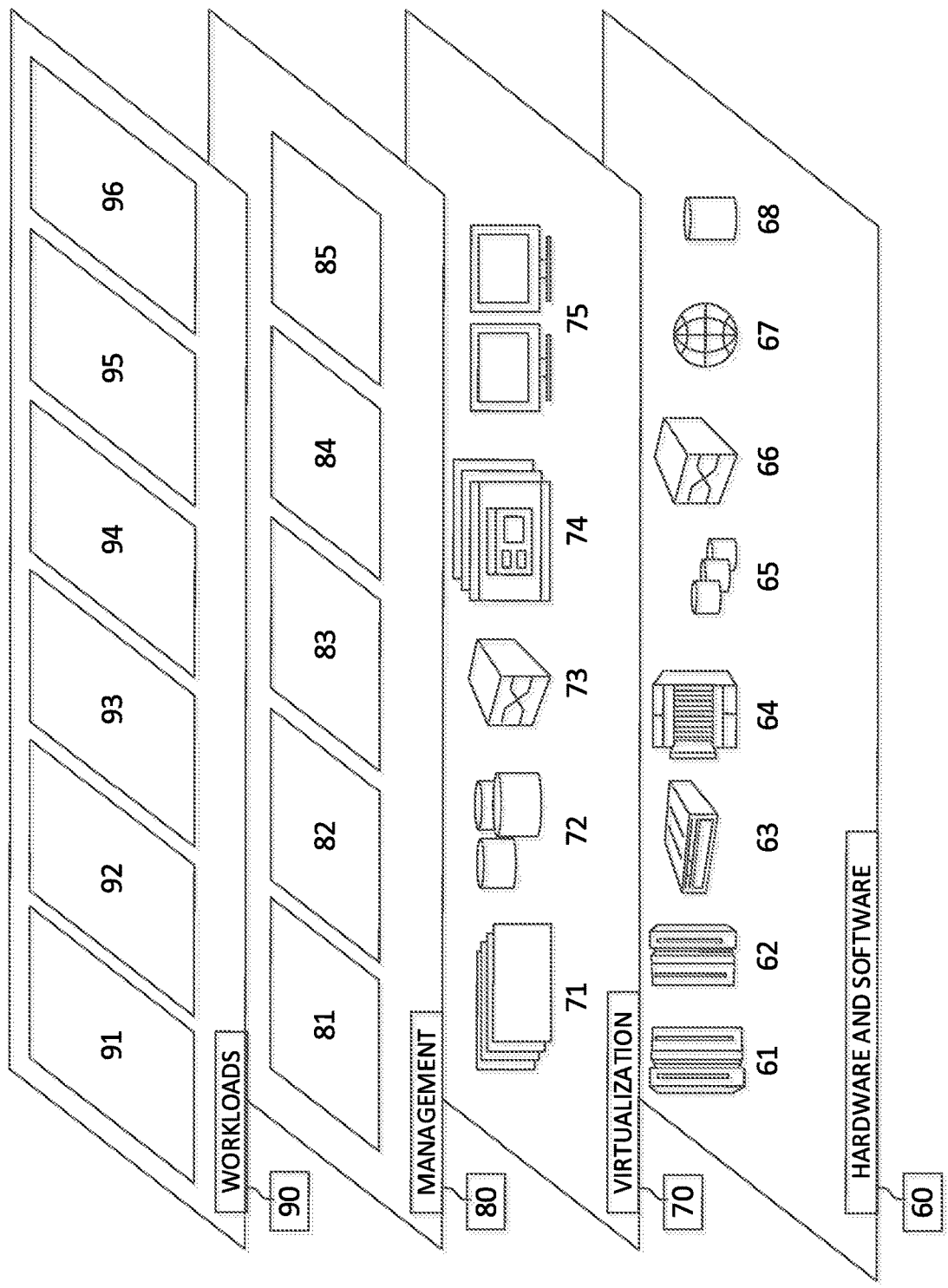
FIG. 5 depicts abstraction model layers, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for entering a user input based on validating a user identity, the method comprising:
    receiving a user input from a user, wherein the user input comprises a poll selection corresponding to a vote cast by the user and received via a computing device;
    capturing one or more user characteristics corresponding to the user via one or more sensors, wherein at least one user characteristic is captured from a government-issued identification card of the user;
    extracting one or more reference user characteristics corresponding to the user from a user reference database;
    determining whether the one or more captured user characteristics match the one or more extracted reference user characteristics;
    based on determining that the one or more captured user characteristics match the one or more extracted reference user characteristics, recording the received user input by entering the received vote cast by the user via the computing device, displaying statistics comprising a distribution of votes cast, and printing a reference receipt comprising timestamp data and the one or more captured user characteristics; and
    based on determining that the one or more captured user characteristics do not match the one or more extracted reference user characteristics, preventing the user input from being entered, providing feedback indicating a reason the one or more captured user characteristics do not match the one or more extracted reference user characteristics, and providing recourse to the user based on the reason, wherein the recourse is selected between providing the user an opportunity to provide additional information to cure one or more deficiencies causing the determined mismatch and directing the user to an authoritative body.

2. The computer implemented method of claim 1, further comprising:
    prompting the user to answer one or more identity verification questions;
    determining whether the user answered the one or more identity verification questions correctly; and
    wherein determining whether the one or more captured user characteristics match the one or more extracted reference user characteristics is further based on determining that the user answered the one or more identity verification questions correctly.

3. The computer implemented method of claim 1, wherein the one or more sensors capture biometric data.

4. The computer implemented method of claim 1, wherein the one or more sensors capture behaviometric data.

5. The computer implemented method of claim 1, wherein the one or more captured user characteristics are weighted; and
    wherein determining whether the one or more captured user characteristics match the one or more extracted reference user characteristics is further based on a weight of the matches exceeding a threshold.

6. A computer program product for entering a user input based on validating a user identity, the computer program product comprising:
    one or more non-transitory computer-readable storage media and program instructions stored on the one or more non-transitory computer-readable storage media capable of performing a method, the method comprising:
    receiving a user input from a user, wherein the user input comprises a poll selection corresponding to a vote cast by the user and received via a computing device;
    capturing one or more user characteristics corresponding to the user via one or more sensors, wherein at least one user characteristic is captured from a government-issued identification card of the user;
    extracting one or more reference user characteristics corresponding to the user from a user reference database;
    determining whether the one or more captured user characteristics match the one or more extracted reference user characteristics;
    based on determining that the one or more captured user characteristics match the one or more extracted reference user characteristics, recording the received user input by entering the received vote cast by the user via the computing device, displaying statistics comprising a distribution of votes cast, and printing a reference receipt comprising timestamp data and the one or more captured user characteristics; and
    based on determining that the one or more captured user characteristics do not match the one or more extracted reference user characteristics, preventing the user input from being entered, providing feedback indicating a reason the one or more captured user characteristics do not match the one or more extracted reference user characteristics, and providing recourse to the user based on the reason, wherein the recourse is selected between providing the user an opportunity to provide additional information to cure one or more deficiencies causing the determined mismatch and directing the user to an authoritative body.

7. The computer program product of claim 6, further comprising:
    prompting the user to answer one or more identity verification questions;
    determining whether the user answered the one or more identity verification questions correctly; and
    wherein determining whether the one or more captured user characteristics match the one or more extracted reference user characteristics is further based on determining that the user answered the one or more identity verification questions correctly.

8. The computer program product of claim 6, wherein the one or more sensors capture biometric data.

9. The computer program product of claim 6, wherein the one or more sensors capture behaviometric data.

10. The computer program product of claim 6, wherein the one or more captured user characteristics are weighted; and wherein determining whether the one or more captured user characteristics match the one or more extracted reference user characteristics is further based on a weight of the matches exceeding a threshold.

11. A computer system for entering a user input based on validating a user identity, the computer system comprising:
one or more computer processors, one or more computer-readable storage media, and program instructions stored on one or more of the computer-readable storage media for execution by at least one of the one or more processors capable of performing a method, the method comprising:
receiving a user input from a user, wherein the user input comprises a poll selection corresponding to a vote cast by the user and received via a computing device;
capturing one or more user characteristics corresponding to the user via one or more sensors, wherein at least one user characteristic is captured from a government-issued identification card of the user;
extracting one or more reference user characteristics corresponding to the user from a user reference database;
determining whether the one or more captured user characteristics match the one or more extracted reference user characteristics;
based on determining that the one or more captured user characteristics match the one or more extracted reference user characteristics, recording the received user input by entering the received vote cast by the user via the computing device, displaying statistics comprising a distribution of votes cast, and printing a reference receipt comprising timestamp data and the one or more captured user characteristics; and
based on determining that the one or more captured user characteristics do not match the one or more extracted reference user characteristics, preventing the user input from being entered, providing feedback indicating a reason the one or more captured user characteristics do not match the one or more extracted reference user characteristics, and providing recourse to the user based on the reason, wherein the recourse is selected between providing the user an opportunity to provide additional information to cure one or more deficiencies causing the determined mismatch and directing the user to an authoritative body.

12. The computer system of claim 11, further comprising:
prompting the user to answer one or more identity verification questions;
determining whether the user answered the one or more identity verification questions correctly; and
wherein determining whether the one or more captured user characteristics match the one or more extracted reference user characteristics is further based on determining that the user answered the one or more identity verification questions correctly.

13. The computer system of claim 11, wherein the one or more sensors capture biometric data.

14. The computer system of claim 11, wherein the one or more captured user characteristics are weighted; and
wherein determining whether the one or more captured user characteristics match the one or more extracted reference user characteristics is further based on a weight of the matches exceeding a threshold.

* * * * *